United States Patent [19]

Kim

[11] Patent Number: 5,898,879
[45] Date of Patent: *Apr. 27, 1999

[54] POWER CONSUMPTION REDUCING APPARATUS IN USING NO CPU BUS SYSTEM AND METHOD THEREOF

[75] Inventor: Man-seop Kim, Seoul, Rep. of Korea

[73] Assignee: Samsung Electronics Co., Ltd., Kyungki-Do, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/581,369

[22] Filed: Dec. 29, 1995

[30] Foreign Application Priority Data

Dec. 30, 1994 [KR] Rep. of Korea ...................... 94-39684

[51] Int. Cl.⁶ ..................................................... G06F 13/28
[52] U.S. Cl. ............................... 395/750.04; 395/750.02; 395/750.03; 395/560; 364/707
[58] Field of Search ..................................... 395/750, 550, 395/296, 560, 800, 280, 750.02, 750.04, 750.03; 364/707

[56] References Cited

U.S. PATENT DOCUMENTS 4,807,112  2/1989  Hamasaki ................................ 395/879
5,471,625  11/1995  Mussemann et al. ............. 395/750.04

*Primary Examiner*—Ayaz R. Sheikh
*Assistant Examiner*—Rupal D. Dharia
*Attorney, Agent, or Firm*—Pillsbury Madison & Sutro LLP

[57] ABSTRACT

A bus master (other than the CPU) sends a signal to a bus controller requesting use of the bus. After receiving the bus-use request signal from the bus master, the bus controller sends a hold signal to the CPU to separate the CPU from the bus. The CPU then outputs a hold response signal in response to the hold signal. Upon receiving the hold response signal from the CPU, the bus controller sends a signal to the bus master requesting use of the bus indicating that that bus master can use the bus. The bus controller also sends a signal to a clock signal generator, which lowers the clock speed below a certain threshold or switches it into a stop clock state. Once the bus controller senses that the bus master is finished using the bus, the bus controller stops the above-mentioned signal sent to the bus master indicating that the bus master can use the bus.

6 Claims, 2 Drawing Sheets

Normal    : Full speed
CPU HOLD : Low or 0MHz

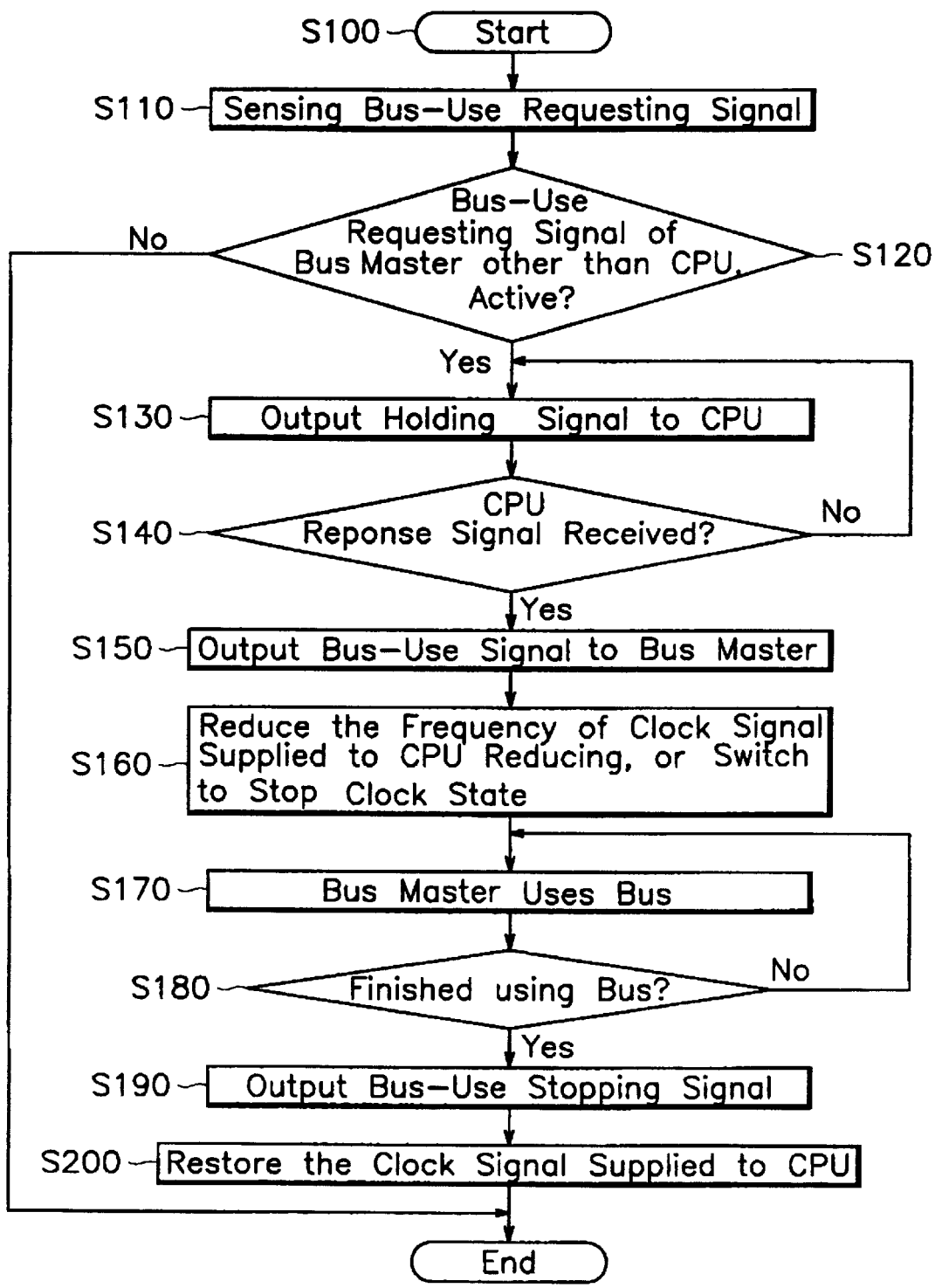

POWER CONSUMPTION REDUCING APPARATUS IN USING NO CPU BUS SYSTEM AND METHOD THEREOF

BACKGROUND OF THE INVENTION (1) Field of Invention

The present invention relates to a power consumption reducing apparatus for a computer bus system and an associated method for reducing power consumption. Particularly, the present invention relates to reducing power consumption during a CPU idle condition when a bus master other than the CPU, such as a Direct Memory Access (DMA) controller or a refresh controller, uses the bus system. Power consumption is reduced by lowering or stopping a clock signal supplied to the CPU.

(2) Description of Related Art

Recently, development of computer technology has taken into consideration functional aspects as well as power saving aspects. Therefore, a Power Management System (PMS) is used in a personal computer to maximize power savings in accordance with a current operational state of the computer.

As illustrated in FIG. 1, the Power Management System (PMS) is divided into a normal mode 10, a doze mode 12, a standby mode 14, a suspend mode 16, and an off mode 18 in accordance with the power supply.

The normal mode 10 refers to the normal operational state of the system.

The doze mode 12 reduces the clock speed of the CPU ½, ¼, or ⅛ when the system is inactive, e.g., when a hard disk is not accessed via the serial input/output interface, or when the video display, the FDD, the keyboard, etc., are not active.

The standby mode 14 reduces the clock speed of the CPU when there is no system activity, shuts off the video display, and/or places the HDD in a standby mode.

The suspend mode 16 stops or shuts off the CPU clock, the HDD, the FDD, and the video display, but not the memory, in order to reduce power usage.

The PMS restores the system to its normal mode 10 from the doze and standby modes 12, 14 if system activity is sensed. The system is restored from the suspend mode 16 by, for example, pushing a suspend/resume button on the computer. The system is switched between the normal mode 10 and the off mode 18 by a conventional on/off switch.

In conventional PMS processes, however, the CPU is supplied with a full speed clock signal when the FDD is accessed, or when a bus master (for example, a DMA controller, a refresh controller, a Small Computer System Interface (SCSI), an Enhanced Small Device Interface HDD controller, a LAN card, a sound card, etc.) is allowed to use the bus system.

Therefore, power consumption associated with the clock signal supplied to the CPU is increased when a bus master, other than the CPU, uses the bus, because the CPU performs only an internal calculation.

SUMMARY OF THE INVENTION

The present invention seeks to solve the above-described conventional problems, and to provide a power consumption reducing apparatus and method in a bus system where a bus master, (other than a CPU), uses the bus system. According to the present invention, the frequency of a clock signal supplied to the CPU is lowered or switched to a stop-clock state.

According to the present invention, a bus master (other than the CPU) sends a signal to a bus controller requesting use of the bus. After receiving the bus-use request signal from the bus master, the bus controller sends a hold signal to the CPU to separate the CPU from the bus. The CPU then outputs a hold response signal in response to the hold signal. Upon receiving the hold response signal from the CPU, the bus controller sends a signal to the bus master requesting use of the bus indicating that that bus master can use the bus. The bus controller also sends a signal to a clock signal generator, which lowers the clock speed below a certain threshold or switches it into a stop clock state. Once the bus controller senses that the bus master is finished using the bus, the bus controller stops the above-mentioned signal sent to the bus master indicating that the bus master can use the bus.

BRIEF DESCRIPTION OF THE DRAWINGS

FIG. 3 is an operational flow chart of the power consumption reducing method in a bus system in accordance with a preferred embodiment of the invention.

DETAILED DESCRIPTION OF THE PREFERRED EMBODIMENTS

With reference to the drawings a preferred embodiment of the invention is described below.

Figure 1:
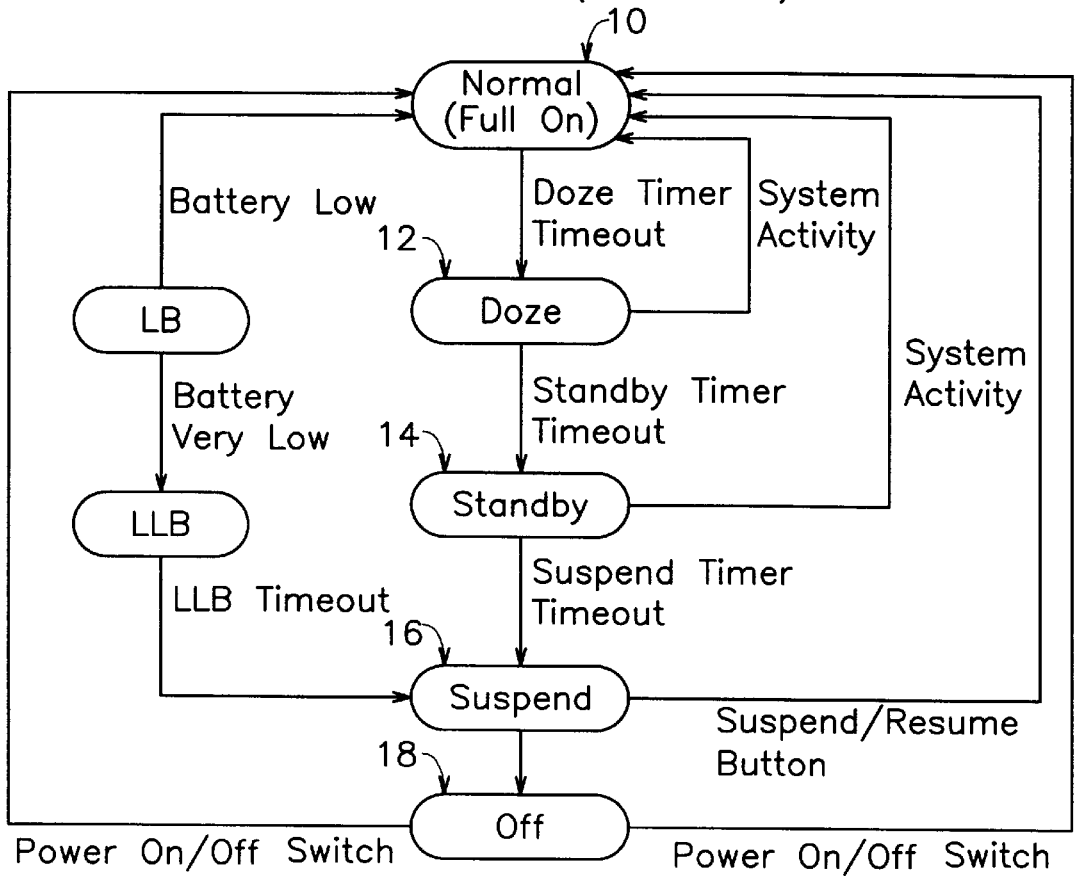
FIG. 1 is a view showing a control flow in a conventional power consumption managing method in a computer.
Figure 2:
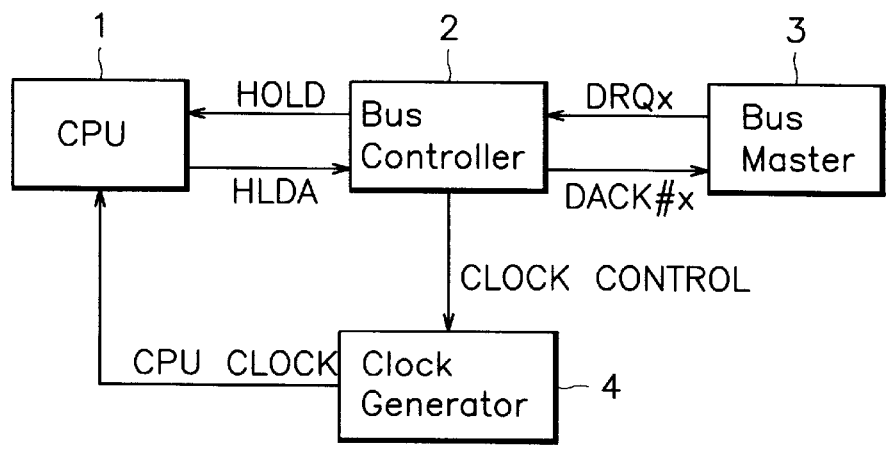
FIG. 2 is a schematic block diagram of a power consumption reducing apparatus in a bus system in accordance with a preferred embodiment of the invention.

As illustrated in FIG. 2, a power consumption reducing apparatus in a bus system, in accordance with a preferred embodiment of the invention, comprises a CPU 1, a generic bus master 3 which asks to use the bus (not shown), a bus controller 2 which prioritizes bus use and which sends a clock control signal to lower or stop the frequency of a clock signal supplied to the CPU, and a clock generator 4 which outputs a variable frequency clock signal.

During operation, the bus controller 2 senses a bus-use request signal DRQx received from a bus master 3 and determines the priority of the bus master 3 in using the bus (steps S110—S120). A DMA controller or a refresh controller requests a bus using right from the bus controller 2 with a bus-use requesting signal. A bus master 3 other than the DMA controller and the refresh controller requests the bus controller 2 for use of the bus with one of the bus-use requesting signals DRQ0 to DRQ7.

Once a signal requesting use of the bus is received from the bus master 3 (other than the CPU 1), the bus controller 2 sends a holding signal HOLD to CPU 1 requesting separation of the data or address bus from CPU 1 (step S130).

The bus controller 2 then senses if a response signal HLDA, in response to the signal HOLD, is output from CPU 1. Hold signal HOLD stops usage of the bus (step S140).

After the response signal HLDA is output by the CPU 1 and received by the bus controller 2 so as to permit other peripheral devices to use the bus, the bus controller 2 sends a bus-using signal DACK to the bus master 3 which requested use of the bus. This lets the bus master 3 know that it can use the bus. (step S150).

In addition, the bus controller 2, after sending the bus-using signal DACK to the bus master 3, sends a clock controlling signal to the clock generator 4 which lowers the frequency of clock signal supplied to CPU 1 below a predetermined threshold or transfers the clock generator 4 into a 0 Hz stop clock state (step S160). The clock generator 4 varies and outputs the clock frequency supplied to CPU 1 in accordance with the aforementioned clock controlling signal output by the bus controller 2.

Once the bus master 3 (excluding the CPU 1), in accordance with the bus-using signal DACK generated by the bus controller 2, finishes using the bus, the bus master 3 outputs a signal indicating that it is finished using the bus. This indicates to the bus controller 2 that the bus master 3 has finished using the bus (step S170 and S180).

If the bus master 3 is finished using the bus, the bus controller 2 stops the bus-using signal DACK (step S190).

In addition, if the bus master 3 is finished, the bus controller 2 sends a clock controlling signal to the clock generator 4 to restore the clock frequency supplied to the CPU 1 to its former state (step S200). The clock generator 4 therefore converts the frequency of the clock signal supplied to CPU 1, which was lowered below a predetermined threshold or which was transferred into a stop clock state, in accordance with the controlling signal output by the bus controller 2, and completes its operation (step S210).

What is claimed is:

1. A power consumption control apparatus for a computer bus system which controls access to a bus, comprising:

a central processor unit (CPU);

a bus master for generating a bus use request signal;

a bus controller joined to said CPU and the bus master for receiving said bus use request signal and sending a hold signal to the CPU in response to the bus use request signal, said CPU sending a hold acknowledgement signal to the bus controller in response to said hold signal, and said bus controller sending a bus using signal to the bus master in response to sensing of the hold signal by the bus controller, said bus using signal indicating the availability of the bus for use by the bus master; and a variable frequency signal clock generator joined to the bus controller and the CPU, said clock signal generator being responsive:

(1) to a clock controlling signal produced by the bus controller when the bus using signal is sent to the bus master for reducing the frequency of the clock signal supplied to the CPU by the generator; and (2) to a clock controlling signal produced by the bus controller when the bus using signal to the bus master terminates for increasing the frequency of the clock signal supplied to the CPU by the generator.

2. An apparatus according to claim 1; wherein the clock controlling signal produced by the bus controller when the bus using signal to the bus master is terminated increases the frequency of the clock signal to an initial frequency used to operate the CPU at full power.

3. An apparatus according to claim 1, wherein the clock controlling signal produced by the bus controller when the bus using signal is sent to the bus master stops the clock signal supplied to the CPU.

4. A method for controlling power consumption in a computer bus system which controls access to a bus, comprising:

sensing whether a bus master is requesting use of the bus by generating a bus use request signal;

generating a hold signal in a bus controller in response to the bus use request signal and sending the hold signal to a central processing unit (CPU) so as to separate the CPU and the bus;

sensing in the bus controller whether the CPU has generated a hold acknowledgement signal in response to said hold signal thereby indicating the availability of the bus for use;

sending a bus using signal to the bus master from the bus controller in response to sensing of a hold acknowledgement signal in the bus controller to permit the bus master to use the bus;

sending a clock controlling signal from the bus controller to a variable frequency clock signal generator which is joined to the CPU, the clock controlling signal reducing the frequency of the clock signal supplied to the CPU by the generator when the bus using signal is sent to the bus master and increasing the frequency of the clock signal supplied to the CPU by the generator when the bus using signal to the bus master terminates.

5. The method according to claim 4, wherein the controlling signal stops the clock signal when the bus using signal is sent to the bus master.

6. The method according to claim 4, wherein the controlling signal increases the clock signal to an initial frequency used to operate the CPU at full power when the bus using signal to the bus master terminates.

* * * * *